Patented Nov. 13, 1951

2,574,893

UNITED STATES PATENT OFFICE 2,574,893

METHOD OF PREPARING RESINOUS COMPOSITIONS

Ralph J. Signer, Chicago, Ill., assignor to The Visking Corporation, Chicago, Ill., a corporation of Virginia No Drawing. Application January 17, 1946, Serial No. 641,876

4 Claims. (Cl. 260—45.5)

This invention relates to resinous compositions and to the method of making the same. More particularly, it relates to resinous compositions containing butadiene-acrylonitrile copolymer and to the method of making the same.

In one method of preparing butadiene-acrylonitrile copolymer the crumbs of such copolymer, after formation and drying, are sheeted in a continuous rubber mill in a once-through operation and thereafter cut, stacked and baled or formed into cheeses. The once-through operation in the mill is not a milling operation which breaks down the molecular structure of the copolymer but serves merely to concentrate the crumbs in a compact mass. Prior to processing it has been the practice to mill the copolymer to break down the molecular structure thereof. If the milled copolymer is not processed shortly after milling, the copolymer will recover, i. e., the molecular structure will revert back to its original state.

U. S. Patent 2,330,353 discloses preparing compositions containing butadiene-acrylontrile copolymer and polyvinyl chloride or copolymer of vinyl chloride by milling the ingredients preferably in the presence of heat until a homogeneous mass is obtained. In its specific embodiment, said patent discloses breaking down the butadiene-acrylonitrile copolymer to the plastic condition on a mill and then milling polyvinyl chloride into the copolymer until a homogeneous mass is obtained.

U. S. Patent 2,367,629 discloses a procedure of producing an adhesive containing butadiene-acrylontrile copolymer and a copolymer of vinyl chloride and vinyl acetate. According to the procedure disclosed in this patent, the butadiene-acrylonitrile copolymer, after milling, and to which various compounding ingredients were added during milling, was cut into small pieces and placed in a churn with a solvent. After the churning had continued for a substantial period of time, the vinyl resin was added to the material in the churn.

India Rubber World, vol. 108, page 249, and vol. 108, page 363 disclose that when butadiene-acrylonitrile copolymer constitutes an ingredient of a cement, such copolymer is milled prior to dissolution in an appropriate solvent. When the adhesive is to contain also a vinyl resin, the latter is dissolved in an appropriate solvent and the solution blended with the solution containing the milled butadiene-acrylonitrile copolymer. Alternatively, the butadiene-acrylonitrile copolymer and a plasticized vinyl chloride resin are blended on a mill, and the resulting blend used as a starting material to produce desired cement batches by compounding with appropriate ingredients.

As indicated by the prior art hereinbefore referred to, the prior art deemed it essential to mill the butadiene-acrylonitrile copolymer before dissolving the same in an appropriate solvent. Not only is the milling of butadiene-acrylonitrile copolymer undesirable because of added cost of operation, but a dope produced from milled butadiene-acrylonitrile copolymer cannot be formed into thin-walled seamless tubing by the wet process, i. e. extrusion through an annular nozzle into a coagulating bath which is miscible with the solvent of the dope but in which the resin is insoluble. In such a procedure, the coagulated structure, particularly in the early stages of coagulation and drying, is soft and sticky, with the result that, when it is conducted through the coagulating bath and washing baths as well as during the drying operation, whenever the film folded on itself or passed over the conveyer and guide rolls it would stick together so that it could not be conducted through the various stages of the process.

An object of this invention is to provide a new and improved resinous composition.

Another object of this invention is to provide a dope containing butadiene-acrylonitrile copolymer and a polymeric vinyl chloride or polymeric vinylidene chloride which can be extruded into film, particularly continuous seamless tubing, by the wet process.

An additional object of this invention is to provide a new and novel method of preparing the above-mentioned dopes.

Other and additional objects will become apparent hereinafter.

The above objects are accomplished, in general, by swelling unmilled appropriately sized slabs of butadiene-acrylonitrile copolymer, in the absence of milling and mechanical disintegration, in an appropriate quantity of a volatile solvent, such as acetone, until the slabs have increased to from 2 to 3 times their original thickness, at which time the swollen mass is rapidly stirred in the cold (20° C.–22° C.) until a finely grained dispersion of gel particles is obtained. The mass at this stage is of jelly-like consistency and appears to be homogeneous but, on pouring or disturbing with a glass rod, gel-like particles can be detected. These vary in size from very small to as much as ½" in any direction. Withdrawing a glass rod from this mixture does not produce a continuous filament or stringing dope. In fact, the mass shows little inclination to stick to the rod.

The desired amount of polymeric vinyl chloride is added to the above-described finely grained dispersion of gel particles and the mass rapidly agitated with rising temperature to about 100° C. (the temperature being raised to about 100° C. in about 20 minutes) and under pressure of from 40 to 45 lbs. per square inch. This agitation under heat and pressure is continued until the dope obtained shows a definite tendency to string when a glass rod is withdrawn from below the surface thereof. The total time required to produce this result is from 2½ to 3 hours from the time that the agitation and heating was begun.

Vinylidene chloride-vinyl chloride copolymer (containing up to about 70% vinylidene chloride) can be used in place of polymeric vinyl chloride. In the preferred form, such copolymer in a solvent, such as dioxane, is added to the finely grained dispersion of gel particles and the mass agitated with rising temperature to about 90° C. and under pressure of 40 to 45 lbs. per square inch, until the dope obtained shows a definite tendency to string when a glass rod is withdrawn from below the surface thereof.

The carrying out of the method is not restricted to any particular apparatus. In the preferred embodiment of the invention, the entire process can be carried out in a mixer having a propeller-type mixer and which can be sealed during the latter part of the process. When such an apparatus is used, the desired quantity of butadiene-acrylonitrile copolymer is introduced into the mixer to which the volatile solvent had been previously or is subsequently added. The stirrer is maintained stationary until the butadiene-acrylonitrile copolymer has been swollen to the desired extent. Then the agitator is actuated to rapidly stir the mass to produce the finely grained dispersion of gel particles. After the introduction of the desired amount of polymeric vinyl chloride or the vinylidene chloride copolymer (in a volatile solvent, such as dioxane), the mixer is sealed and the agitator actuated to provide the rapid stirring. The temperature of the contents in the agitator is increased to 100° C. in about 20 minutes, and a pressure of from 40 to 45 lbs. per square inch develops in the mixer.

The details and manner of practicing the invention will become apparent by reference to the following specific examples, it being understood that these examples are merely illustrative embodiments of the invention and that the scope of the invention is not limited thereto. Throughout the examples, the proportions of the ingredients are parts by weight.

Example 1

In a mixer in the form of a cylinder 12″ in diameter and 22″ in height having a propeller-type mixer action at 1800 R. P. M. and of 6½″ total length from tip to tip, there were introduced 90 parts of acetone. 4.5 parts of unmilled butadiene-acrylonitrile copolymer (45% acrylonitrile) in the form of slabs, ranging in size from 12″ x 16″ x ½″ to 16″ x 24″ x ¾″, were added to the acetone. The slabs were permitted to swell in the acetone until they increased to from 2 to 3 times their original thickness. At this time, the stirrer was actuated and the mass stirred in the cold (20° C.–22° C.) until a finely grained dispersion of gel particles was obtained. 4.5 parts of polyvinyl chloride were then added, and the apparatus sealed. The temperature was increased to 100° C. in about 20 minutes while the mass was being agitated. During agitation, a pressure of from 40 to 45 lbs. per square inch developed. The agitation under heat (100° C.) and pressure (40 to 45 lbs. per square inch) was continued for from 2½ to 3 hours from the time that the agitation and heating were begun.

The dope was a substantially homogeneous dope which showed a definite tendency to string when a glass rod was withdrawn from below the surface thereof, and it could be poured continuously in a fine stream.

Example 2

A dope of the following composition was prepared by the process described in Example 1:

| | Parts |
|---|---|
| B u t a d i e n e-acrylonitrile copolymer (45% acrylonitrile) | 4.5 |
| V i n y l chloride-vinyl acetate copolymer (95% vinyl chloride) | 4.5 |
| Acetone | 90.0 |

The dope showed a definite stringing tendency when a glass rod was withdrawn from below the surface thereof and it could be poured continuously in a fine stream.

Example 3

In the apparatus described in Example 1, to which 75 parts of acetone had been introduced, there were added 4.5 parts of unmilled butadiene-acrylonitrile copolymer (40%–45% acrylonitrile). The butadiene-acrylonitrile copolymer was first swollen and then agitated as set forth in Example 1. 4.5 parts of vinylidene chloride-vinyl chloride copolymer (70% vinylidene chloride and 30% vinyl chloride) in 15 parts of dioxane were added to the finely grained dispersion of the butadiene-acrylonitrile copolymer. The apparatus was sealed, and the temperature increased to 90° C. with agitation. A pressure of from 40 to 45 lbs. per square inch developed. The agitation under these conditions of heat and pressure was continued until the dope obtained showed a definite tendency to string when a glass rod was withdrawn from below the surface thereof.

The dopes obtained by the method of this invention show less tendency to form granular gel particles than dopes containing only butadiene-acrylonitrile copolymer at (1) a concentration equal to that of the combined copolymers and (2) a concentration equal to that of the butadiene-acrylonitrile copolymer in the dope. The dopes obtained from each of the examples can be processed by a wet process to form continuous film, such as, preferably, continuous seamless tubing. For example, the dopes made by this method can be extruded through an annular nozzle, of the type disclosed in U. S. Patent 1,601,686, into a coagulating bath consisting essentially of water but containing some solvent derived from the dope and preferably also containing a wetting agent, such as the dioctyl ester of sodium sulfo-succinic acid, sulfonated oil, or the like, and after passing through the coagulating bath fed through washing baths. A suitable apparatus for coagulating and washing the seamless tubing is disclosed in U. S. Patent 1,937,225. The washed coagulated seamless tubing is preferably reeled after passing through squeeze rolls to remove excess bath. The reeled tubing is then dried by the process and apparatus disclosed in U. S. Patent 1,967,773.

In the process for producing continuous seamless tubing by the wet process, hereinbefore described, the coagulated tubing is conveyed through the coagulating and wash baths by appropriately positioned conveyer and guide rolls and also through the drier by rolls. During coagulation, the seamless tubing acquires such a character that it can be separated whenever it folds on itself, as would be the case when it passes through the coagulating, washing and drying operations.

In general, the butadiene-acrylonitrile copolymer is obtained by copolymerizing a mixture of the respective monomers in which the acrylonitrile constitutes from about 25% to 60% by weight of the total amount of monomers. In the preferred embodiment of the invention, the butadiene-acrylonitrile copolymer is formed by copolymerizing a mixture of the monomers in which the acrylonitrile is present in an amount consisting of 35% to 45% by weight of the total quantities of the monomers.

The polyvinyl chloride is obtained by polymerizing vinyl chloride in the usual manner. The copolymer of vinyl chloride is one in which the predominant constituent is a vinyl halide, such as a copolymer of vinyl chloride, with a small proportion of vinyl acetate, vinyl cyanide, styrene, methyl methacrylate or the like. Vinyl chloride-vinyl acetate copolymer containing from 87% to 98%, and preferably 95%, vinyl chloride is the preferred copolymer.

The film of each of the dopes of the specific examples was transparent and unvulcanized. It is, however, to be understood that the invention is not restricted thereto and that the films can be vulcanized. Any of the plasticizers, softeners, fillers, reinforcing pigments, age-resisters, accelerators, and vulcanizing ingredients which are ordinarily used in the compounding of rubber or synthetic rubber can be incorporated in the dope. When such a composition is used, the film, after or during drying, is vulcanized in the known manner.

Optionally, substances which aid to eliminate the tendency to adhesion can also be incorporated in the composition. Stearamide and dicetyl ether are illustrative examples of such substances.

The resistance to moisture vapor transmission of the film can also be increased by inclusion in the dope of appropriate substances, such as waxes and the like.

Optionally, plasticizers and coloring agents may also be included in the dope.

The invention is not restricted to the preparation of dopes of the specific proportions disclosed in the examples. The dopes can contain mixtures of butadiene-acrylonitrile copolymer and polymeric vinyl chloride or the copolymer of vinylidene chloride-vinyl chloride (up to about 70% vinylidene chloride) over the entire range of compositions. For example, compositions can be obtained from 99 parts of polymeric vinyl chloride or the aforementioned copolymer of vinylidene chloride and 1 part of butadiene-acrylonitrile copolymer, to 1 part of the first copolymer and 99 parts of the second copolymer. For unvulcanized films, in general, the percentage of butadiene-acrylonitrile copolymer constitutes from 5% to 65% by weight of the total amount of copolymers in the dope. Preferably, the composition for producing unvulcanized films contains butadiene-acrylonitrile copolymer in an amount of from 15% to 50% by weight of the total quantity of the copolymers, but a lower proportion thereof, such as 5% to 10%, may be desirable depending on the mode of packaging. However, for some uses, such as packaging of dressed fowl, films containing from 65% to 75% or more of butadiene-acrylonitrile copolymer (45% acrylonitrile) can be used, for example, in the packaging of dressed fowl. For compositions which are to produce vulcanized film, the butadiene-acrylonitrile copolymer can be present in excess of 60% by weight of the total quantity of the copolymers.

The size of the slabs of the butadiene-acrylonitrile copolymer is not critical. It can be larger or smaller than that set forth in the examples. In general, the size is dependent on the mixer and particularly the inlet to the interior thereof.

The concentration of the total quantity of the two copolymers in the dope is preferably from 10% to 12% by weight, but it is to be understood that the invention is not restricted to such concentration and that, in general, the concentration of the total quantity of the copolymers in the dope can be greater or less depending on the desired thickness of film, rate of extrusion, and the like.

Dopes prepared by the present invention, as hereinbefore described, are admirably suitable for the production of continuous seamless tubing of a wall thickness of from 1 to 4 mils, and preferably 1½ mils.

Though the dopes of the present invention have been described particularly in connection with the production of continuous seamless tubing by the wet process, it is to be understood that the invention is not restricted thereto. The dopes can also be used for the preparation of continuous sheeting of the previously mentioned, or greater or lesser, thickness by the wet process. Likewise, the dopes of this invention can be used in the production of other shaped artificial structures, such as filaments, yarns, caps, bands, etc. by the wet method. Additionally, the dopes can be employed as a coating composition for the coating of various base materials, such as paper, fabric, metal foil, regenerated cellulose, polyvinyl alcohol, nylon, zein, ethyl cellulose, cellulose acetate, etc. Still further, the dopes can be used as a sealing cement for gas-proof seals of resinous sheet materials, as a cement for sealing films of polyvinylidene chloride and its copolymers, as a gasket cement, etc.

Self-sustaining films in the form of continuous sheeting and preferably seamless tubing, produced as herein described, are characterized by high resistance to oxygen and moisture vapor transmission in combination with stretchability and return. Because of these properties, the film, either in the form of continuous sheeting and preferably seamless tubing, is admirably suited for use in wrapping and packaging of any product which is desired to be protected from oxidative and drying reactions and particularly varieties of natural Cheddar cheese and any hard or semi-hard natural cheese, such as Swiss, brick and Munster cheeses.

In addition to the foregoing properties, the film is transparent, thermoplastic, heat-sealable, resilient, has a high tensile strength, has a fair amount of elongation, is printable, contains no substance which will affect the odor and taste of the product wrapped therein or will migrate from the film into the product wrapped therein, resists exudation of fatty substances, and is highly resistant to puncture, all of which properties render the material particularly suitable for packaging or wrapping of cheese of the types previously mentioned and other products.

Herein, the expression "consisting essentially of" is intended to define the named ingredients with or without modifying ingredients, as herein described.

The present invention provides a method of producing dope compositions including butadiene-acrylonitrile copolymer without previously milling or mechanical disintegration of such copolymer. The present invention also provides a method of producing a dope, containing butadiene-acrylonitrile copolymer and polymeric vinyl chloride or polymeric vinylidene chloride, which is relatively stable and is admirably suitable for the production of shaped artificial structures, preferably seamless tubing, by the wet process, and, in such process, when the film folds on itself it can be separated effectively. The method requires no expensive apparatus and can be carried out in a relatively short period of time as compared to prior art methods utilizing milled butadiene-acrylonitrile copolymers.

The expression "unmilled butadiene-acrylonitrile copolymer" or similar terminology as used herein defines a butadiene-acrylonitrile copolymer which has not been milled for the purpose of breaking down the molecular structure thereof.

Since it is obvious that various changes and modifications may be made in the above description without departing from the nature or spirit thereof, this invention is not restricted thereto except as set forth in the appended claims.

I claim:

1. A method of preparing a homogeneous dope composition capable of being extruded into a bath consisting essentially of water to form shaped structures which comprises swelling butadiene-acrylonitrile copolymer in which the acrylonitrile content is between 25% and 60%, in acetone, stirring the swollen mass to form a finely grained dispersion of gel particles, adding to said dispersion a polymer selected from the class consisting of polyvinyl chloride, copolymer of vinyl chloride and vinyl acetate in which the vinyl chloride is the predominant constituent, copolymer of vinyl chloride and vinyl cyanide in which the vinyl chloride is the predominant constituent, copolymer of vinyl chloride and styrene in which the vinyl chloride is the predominant constituent, copolymer of vinyl chloride and methyl methacrylate in which the vinyl chloride is the predominant constituent, and copolymer of vinylidene chloride and vinyl chloride containing up to 70% vinylidene chloride, stirring the resulting mass with rising temperature in a closed vessel until a pressure of 40 to 45 pounds per square inch is developed in said vessel and continuing said stirring until said mass is homogeneous and shows a definite tendency to string when a glass rod is withdrawn from beneath the surface thereof.

2. A method of preparing a homogeneous dope composition capable of being extruded into a bath consisting essentially of water to form shaped structures which comprises swelling butadiene-acrylonitrile copolymer, in which the acrylonitrile content is 25% to 60%, in acetone, stirring the swollen mass to form a finely grained dispersion of gel particles, adding vinyl chloride-vinyl acetate copolymer in which the vinyl chloride content is between 87% and 98% to said finely grained dispersion, and stirring the resulting mass with rising temperature to 100° C. in a closed vessel until it is homogeneous and shows a definite tendency to string when a glass rod is withdrawn from beneath the surface thereof.

3. A method of preparing a homogeneous dope composition capable of being extruded in a bath consisting essentially of water to form shaped structures which comprises swelling butadiene-acrylonitrile copolymer in which the acrylonitrile ride to said finely grained dispersion, and stirring the swollen mass to form a finely grained dispersion of gel particles, adding polyvinyl chloride to said finely grained dispersions, and stirring the resulting mass with rising temperature to 100° C. in a closed vessel until it is homogeneous and shows a definite tendency to string when a glass rod is withdrawn from beneath the surface thereof.

4. A method of preparing a homogeneous dope composition capable of being extruded in a bath consisting essentially of water to form shaped structures which comprises swelling butadiene-acrylonitrile copolymer in which the acrylonitrile content is between 25% and 60%, in acetone, stirring the swollen mass to form a finely grained dispersion of gel particles, adding vinyl chloride-vinylidene chloride copolymer in which the vinylidene chloride is present in an amount up to 70% in dioxane to said finely grained dispersion, and stirring the resulting mass with rising temperature to 90° C. in a closed vessel until it is homogeneous and shows a definite tendency to string when a glass rod is withdrawn from beneath the surface thereof.

RALPH J. SIGNER.

REFERENCES CITED

The following references are of record in the file of this patent:

UNITED STATES PATENTS

| Number | Name | Date |
|---|---|---|
| 1,710,470 | Butler | Apr. 23, 1939 |
| 2,164,400 | Groskopf | July 4, 1939 |
| 2,281,087 | Kutz | Apr. 28, 1942 |
| 2,330,353 | Henderson | Sept. 28, 1943 |
| 2,367,629 | Teppema et al. | Jan. 16, 1845 |
| 2,445,727 | Kinzinger | July 20, 1848 |
| 2,456,454 | Signer | Dec. 14, 1948 |
| 2,459,739 | Groten | Jan. 18, 1949 |

OTHER REFERENCES

"Perbunan" 9 page pamphlet published by Stanco Distributors, received in Patent Office August 13, 1942, page 1, 6 and the flow chart on page 9.

Hycar Blue Book Sec. III OR-15, Group D, page 5, July 1, 1943, pub. by Hycar Chem. Co., Akron, Ohio.

Certificate of Correction

Patent No. 2,574,893                                                        November 13, 1951

RALPH J. SIGNER

It is hereby certified that error appears in the printed specification of the above numbered patent requiring correction as follows:

Column 2, line 53, after "stringing" insert *of*; column 8, line 17, strike out "ride to said finely grained dispersion, and stir-" and insert instead *content is between 25% and 60%, in acetone, stir-*; line 20, for "dispersions" read *dispersion*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*